United States Patent
Mate et al.

(10) Patent No.: US 12,114,148 B2
(45) Date of Patent: Oct. 8, 2024

(54) AUDIO SCENE CHANGE SIGNALING

(71) Applicant: Nokia Technologies Oy, Espoo (FI)

(72) Inventors: Sujeet Shyamsundar Mate, Tampere (FI); Kari Järvinen, Tampere (FI); Jussi Leppänen, Tampere (FI); Lasse Laaksonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 40 days.

(21) Appl. No.: 17/782,398

(22) PCT Filed: Nov. 16, 2020

(86) PCT No.: PCT/FI2020/050759
§ 371 (c)(1),
(2) Date: Jun. 3, 2022

(87) PCT Pub. No.: WO2021/111030
PCT Pub. Date: Jun. 10, 2021

(65) Prior Publication Data
US 2023/0007427 A1    Jan. 5, 2023

(30) Foreign Application Priority Data
Dec. 4, 2019   (GB) .................................. 1917690

(51) Int. Cl.
*H04S 7/00*   (2006.01)
*G06F 3/16*   (2006.01)

(52) U.S. Cl.
CPC .............. *H04S 7/303* (2013.01); *G06F 3/162* (2013.01); *G06F 3/165* (2013.01); *H04S 2420/11* (2013.01)

(58) Field of Classification Search
CPC ...... H04S 7/303; H04S 2420/11; G06F 3/162; G06F 3/165
(Continued)

(56) References Cited

U.S. PATENT DOCUMENTS

2018/0338213 A1   11/2018   Lehtiniemi et al.
2021/0132898 A1*   5/2021   Lee .......................... G06F 3/011

FOREIGN PATENT DOCUMENTS

GB          2575840 A       1/2020
JP          2014-170330 A   9/2014
(Continued)

OTHER PUBLICATIONS

"MPEG-I Audio Architecture and Requirements", Audio subgroup, ISO/IEC JTC1/SC29/WG11 MPEG2019/N18158, Jan. 2019, pp. 1-6.
(Continued)

*Primary Examiner* — Paul Kim
(74) *Attorney, Agent, or Firm* — ALSTON & BIRD LLP (57) ABSTRACT

There is disclosed inter alia a method for rendering a virtual reality audio scene comprising: receiving information defining a limited area audio scene within the virtual reality audio scene (301), wherein the limited area audio scene defines a sub space of the virtual reality audio scene (304), wherein the information defines the limited area audio scene by defining an extent a user can move within the virtual audio scene; determining if the movement of the user within the limited area audio scene meets a condition of an audio scene change (302); and processing the audio scene change when the movement of the user within the limited area audio scene meets the condition of an audio scene change (306).

24 Claims, 7 Drawing Sheets

6DoF Audio Scene with an impact zone scope of limited user movement (58) Field of Classification Search
USPC .......................................................... 381/303
See application file for complete search history.

(56) References Cited

FOREIGN PATENT DOCUMENTS

| WO | 2019/068959 A1 | 4/2019 |
| WO | 2019/121775 A1 | 6/2019 |
| WO | 2019/193251 A1 | 10/2019 |
| WO | 2019/203627 A1 | 10/2019 |
| WO | 2021/058857 A1 | 4/2021 |

OTHER PUBLICATIONS

"MPEG-I 6DoF Audio Encoder Input Format", Audio Sub Group, ISO/IEC JTC1/SC29/WG11 MPEG2019/N18159, Jan. 2019, pp. 1-12.
Search Report received for corresponding United Kingdom Patent Application No. 1917690.8, dated Jun. 2, 2020, 3 pages.
International Search Report and Written Opinion received for corresponding Patent Cooperation Treaty Application No. PCT/FI2020/050759, dated Apr. 6, 2021, 14 pages.
Extended European Search Report received for corresponding European Patent Application No. 20895109.5, dated Nov. 30, 2023, 10 pages.

\* cited by examiner

Figure 1: 6DoF MPEG-I audio retrieval and auralization pipeline.

Fig 2a 6DoF Audio Scene with an impact zone scope of limited user movement

Fig 2b 6DoF Audio Scene with an impact zone scope of greater user movement

AUDIO SCENE CHANGE SIGNALING

RELATED APPLICATION

This application was originally filed as PCT Application No. PCT/FI2020/050759, filed on Nov. 16, 2020, which claims priority from GB Application No. 1917690.8, filed on Dec. 4, 2019, each of which is incorporated herein by reference in its entirety.

FIELD

The present application relates to apparatus and methods for signalling the audio scene changes with respect to audio objects within an audio scene.

BACKGROUND

Virtual reality (VR) generally refers to various capture and rendering technologies for generating realistic images and sounds that replicate a real or imaginary environment and simulate a user's physical presence in this environment. We may refer to this environment as a content consumption space.

The way a user may move within a 3D space may be defined as motion in six degrees of freedom. This movement is divided into two categories: rotational and translational movement (with three degrees of freedom each). Rotational movement is sufficient for a simple VR experience where the user may turn their head (pitch, yaw, and roll) to experience the space from a static or automatically moving point. Translational movement means that the user may also change the position within in the space and thus their position with respect to the rendering of the audio, i.e., move along the x, y, and z axes according to her wishes.

Augmented reality (AR) shares many similarities with VR. Typically, it refers to a direct or indirect view of a physical, real-world environment to which computer-generated sensory input such as sound and graphics is added. Mixed reality (MR) is a term that is used to cover various levels of virtuality of the reality-virtuality spectrum. For most purposes, in the context of the current invention, all these terms may be used interchangeably.

Rendering of six-degrees-of-freedom (6DoF) audio, which is also known as free-viewpoint or free-listening point audio is a rapidly developing field. Specifically, the application of audio rendering controlled by the user (for example the user's head rotation and location in the audio content space) for AR/VR audio is complex and new field. This spatial audio may consist of, for example, a channel-based bed and audio objects, audio objects only, or any equivalent spatial audio representation. It is understood that the audio sources may themselves be dynamic as well as the user. Thus for example the audio source 'default' location in the 3D space may be time-variant.

Object-based audio has many meanings. For example, in the traditional broadcast domain, object-based audio is utilized to offer a broader range of personalization options for the consumer. In this context, a typical audio element delivered as an audio object is dialogue. This may allow, for example, selecting a specific language version or a sports commentary association with one of the competing teams.

With respect to 6DoF free-viewpoint audio, audio objects may be understood as dynamic audio (sources) with various properties and, very importantly, a rendering location. Thus, it is the definition of the audio object locations, or an equivalent spatial audio representation, that allow for the user as a listener to move around a specific audio object, go close to it, distance themselves from it, and so on. The movement of the user therefore affects the way an audio is rendered. For instance, some audio scenes may be complex comprising a large number of audio elements represented as audio objects with each element needing to be individually rendered in space and time as the user moves around the audio scene.

The application of 6DoF audio rendering in AR/VR systems however can be problematic by requiring a considerable processing overhead in order to render an audio scene comprising many audio elements.

SUMMARY

There is according to a first aspect a method for rendering a virtual reality audio scene comprising: receiving information defining a limited area audio scene within the virtual reality audio scene, wherein the limited area audio scene defines a sub space of the virtual reality audio scene, wherein the information defines the limited area audio scene by defining an extent a user can move within the virtual audio scene; determining whether the movement of the user within the limited area audio scene meets a condition of at least one audio scene change; and processing the at least one audio scene change when the movement of the user within the limited area audio scene meets the condition of the at least one audio scene change.

The extent may be defined as a number of predetermined directional steps, wherein each of the predetermined directional steps may have at least one associated audio scene change condition and wherein the at least one audio scene change condition may be associated with a respective at least one audio scene change, wherein determining whether the movement of the user within the limited area audio scene meets a condition of the at least one audio scene change may comprise determining that the movement of the user meets the at least one audio scene change condition of one of the number of predetermined directional steps, and wherein processing the at least one audio scene change when the movement of the user within the limited area audio scene meets the condition of the at least one audio scene change may comprise processing the respective at least one audio scene change associated with the at least one audio scene change condition.

The extent may be defined as an area of the virtual reality audio scene within a physical room, wherein the area may have at least one associated audio scene change condition and wherein the at least one audio scene change condition may be associated with a respective at least one audio scene change, wherein determining whether the movement of the user within the limited area audio scene meets a condition of at least one audio scene change may comprises determining that the movement of the user meets the at least one audio scene change condition of the area, and wherein processing the at least one audio scene change when the movement of the user within the limited area audio scene meets the condition of the at least one audio scene change may comprise processing the respective at least one audio scene change associated with the at least one audio scene change condition Each defined directional step or movement may be accompanied by an indication as to the processing burden required to process the respective at least one audio scene change.

The information defining the limited area audio scene may be a data structure of a timed metadata track.

The data structure may comprise for the at least one audio scene change at least one of the following data fields: an identifier indicating an audio scene associated with the condition of the at least one audio scene change; an identifier identifying a group of audio elements comprising an audio element associated with the condition of the at least one audio scene change condition; and an identifier identifying an audio element associated with the condition of the least one audio scene change.

The information defining a limited area audio scene may be part of a sample entry within a timed metadata track according to the ISOBMFF.

The at least one audio scene change may be defined by at least one audio element and the rendering parameters of the at least one audio element.

The at least one audio element may comprise at least one of: an audio object; an audio channel; and higher order ambisonics.

According to a second aspect there is an apparatus for rendering a virtual reality audio scene comprising: means for receiving information defining a limited area audio scene within the virtual reality audio scene, wherein the limited area audio scene defines a sub space of the virtual reality audio scene, wherein the information defines the limited area audio scene by defining an extent a user can move within the virtual audio scene; means for determining whether the movement of the user within the limited area audio scene meets a condition of at least one audio scene change; and means for processing the at least one audio scene change when the movement of the user within the limited area audio scene meets the condition of the at least one audio scene change.

The extent may be defined as a number of predetermined directional steps, wherein each of the predetermined directional steps has at least one associated audio scene change condition and wherein the at least one audio scene change condition may be associated with a respective at least one audio scene change, wherein the means for determining whether the movement of the user within the limited area audio scene meets a condition of the at least one audio scene change may comprise means for determining that the movement of the user meets the at least one audio scene change condition of one of the number of predetermined directional steps, and wherein means for processing the at least one audio scene change when the movement of the user within the limited area audio scene meets the condition of the at least one audio scene change may comprise means for processing the respective at least one audio scene change associated with the at least one audio scene change condition.

The extent may be defined as an area of the virtual reality audio scene within a physical room, wherein the area may have at least one associated audio scene change condition and wherein the at least one audio scene change condition may be associated with a respective at least one audio scene change, wherein the means for determining whether the movement of the user within the limited area audio scene meets a condition of at least one audio scene change may comprise means for determining that the movement of the user meets the at least one audio scene change condition of the area, and wherein the means for processing the at least one audio scene change when the movement of the user within the limited area audio scene meets the condition of the at least one audio scene change may comprise means for processing the respective at least one audio scene change associated with the at least one audio scene change condition.

Each defined directional step or movement may be accompanied by an indication as to the processing burden required to process the respective at least one audio scene change.

The information defining the limited area audio scene may be a data structure of a timed metadata track.

The data structure may comprise for the at least one audio scene change at least one of the following data fields: an identifier indicating an audio scene associated with the condition of the at least one audio scene change; an identifier identifying a group of audio elements comprising an audio element associated with the condition of the at least one audio scene change condition; and an identifier identifying an audio element associated with the condition of the least one audio scene change.

The information defining a limited area audio scene may be part of a sample entry within a timed metadata track according to the ISOBMFF.

The at least one audio scene change may be defined by at least one audio element and the rendering parameters of the at least one audio element.

The at least one audio element may comprise at least one of: an audio object; an audio channel; and higher order ambisonics.

According to a third aspect there is an apparatus for rendering a virtual reality audio scene comprising at least one processor and at least one memory including computer program code, the at least one memory and the computer program code configured to, with the at least one processor, cause the apparatus to: receive information defining a limited area audio scene within the virtual reality audio scene, wherein the limited area audio scene defines a sub space of the virtual reality audio scene, wherein the information defines the limited area audio scene by defining an extent a user can move within the virtual audio scene; determine whether the movement of the user within the limited area audio scene meets a condition of at least one audio scene change; and process the at least one audio scene change when the movement of the user within the limited area audio scene meets the condition of the at least one audio scene change.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for improving the decoding, rendering and presentation or outputting of six-degree-of-freedom (6DoF) audio.

As discussed previously the application of 6DoF audio rendering in AR/VR systems however can be problematic by requiring a considerable processing overhead in order to render an audio scene comprising many audio elements. A complex audio scene comprising many audio elements can result in a multitude of different combinations and permutations of rendering parameters that may need to be calculated and checked with respect to the movement of the user around the audio scene. This complexity can be a considerable burden on AR/AR systems rendering 6DoF audio. One way of reducing this computational complexity is to reduce the size of the audio scene in relation to the rendering parameters of each audio element such that audio elements within a smaller area (around the user) are favoured rather than audio elements in the whole audio scene. This invention therefore proceeds from the consideration that the complexity requirements of rendering an audio scene in relation to the movement in time and space of a user may be reduced by having an active audio scene of reduced scope.

Figure 1:
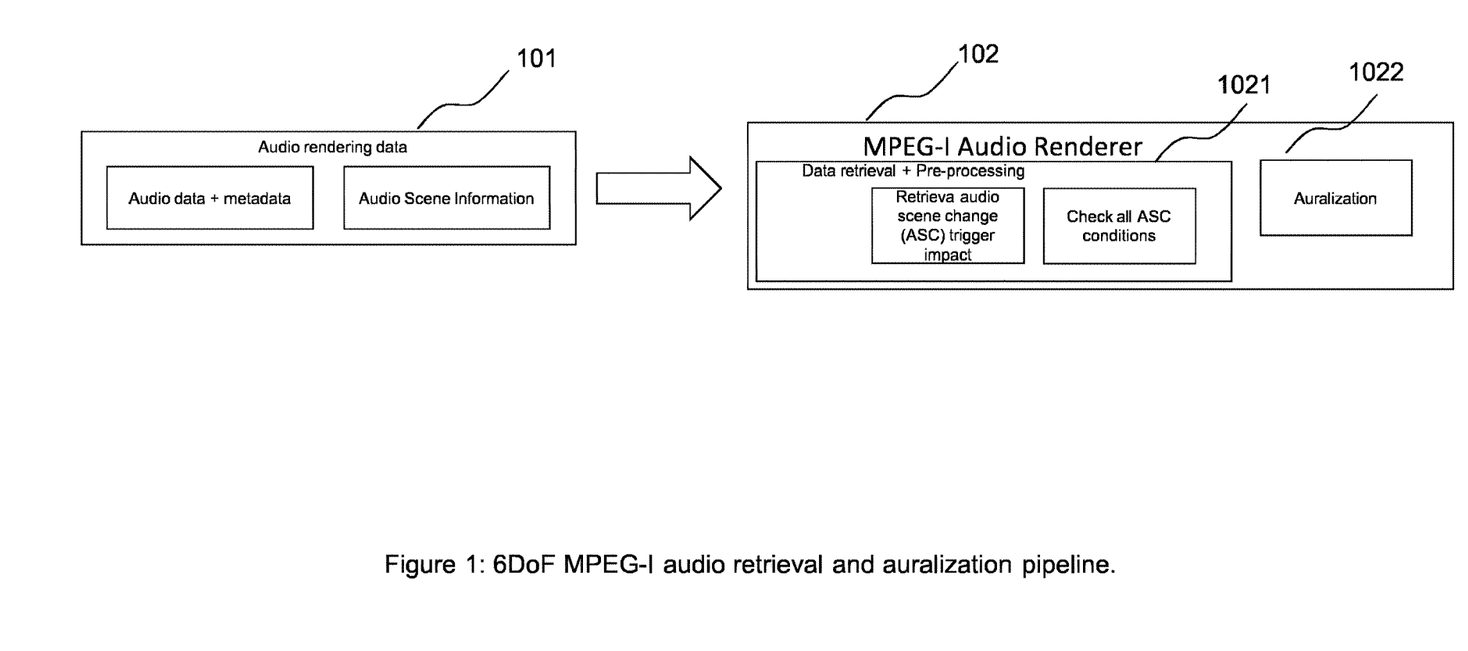
FIG. 1 shows the processing pipeline of a 6DoF audio renderer.

FIG. 1 depicts a framework 6DoF AR/VR system according to the Moving Picture Expert Group standards group known as MPEG-I upon which embodiments may be implemented. Within FIG. 1 there is depicted the Audio rendering data 101 which is typically streamed to or stored on a user device and an MPEG-I Audio Renderer 102 comprising a pipeline for retrieving the audio rendering data 1021 and performing auralization of the rendered audio data 1022. Within the framework depicted in FIG. 1 the audio rendering data 101 may be generally considered to contain information describing an 6DoF Audio scene, and more particularly a MPEG-I 6DoF audio scene. This can encompass all contents of the virtual audio scene, i.e. all of its sound sources in the form of audio elements, and resource data, such as audio waveforms, source radiation patterns and information on the acoustic environment. Additionally, the audio rendering data may cater for audio scene animation by describing how an audio scene may change over time with respect to moving objects.

Within the context of 6DoF AR/VR systems and in particular the framework of the rendering pipeline of FIG. 1 the following terms may be defined.

| | |
|---|---|
| Audio Object | Audio Signal and associated metadata |
| Audio Channel | Audio Signal and associated metadata |
| Higher Order Ambisonics (HOA) | Audio Signal and associated metadata |
| Audio Element | One or more audio signals and associated metadata. Audio Elements are audio objects, channels or HOA signals with associated MPEG-I 6DoF metadata and MPEG-H 3D Audio metadata if appropriate. |
| Acoustic Environment | Metadata describing the acoustic properties of the virtual scene to be rendered, e.g. room or locality. These might include reverberation times (RT60), zones of occlusion, etc. |
| Acoustic Element | Object in VR space that reflects, diffracts and/or absorbs sound. |
| Audio Scene | All audio elements, acoustic elements and acoustic environment which are needed to render the sound in the scene. Note: Audio scene is not the same as scene-based audio (e.g., HOA). |
| User | The listener whose position and orientation are used for rendering. |
| Audio Scene change | Changes in the audio scene which impact the audio rendering. These changes might be triggered by the user. |
| Audio Renderer | Normative functionality that renders sound for the user. The output of the Audio Renderer are the audio signals to be reproduced over headphones or loudspeakers. |
| Audio Rendering Parameters | Parameters that control the audio renderer, such as enabling/disabling specific features (e.g., room acoustics, Doppler shifts) or min/max values, gain values, default values, etc. |

Returning to FIG. 1 in can be seen that the input 101 to the Audio Renderer 102 may comprise a number of audio elements which may comprise any combination of audio objects, audio channels and HOAs. Additionally, the input 101 may also comprise audio scene information which provides a description of the audio scene in the form of a file. The audio scene information file may be viewed as list of instructions drawing together the various different entities such as sound sources, acoustic environment, geometric elements, audio elements into a coherent audio scene.

In some embodiments the audio scene information may take the form of an xml file. Below is a simple example of an xml audio scene information file consisting of a single <AudioScene> node, in which all entities are declared (e.g. sound sources, acoustic environment, geometric elements, audio signals, etc.). The brief example defines a simple, time-invariant test scene with one MPEG-I Audio Object, that represents a trumpet with directivity

```
<AudioScene>
    <AudioStream      id="signal:trumpet"
                      file="armstrong.wav"
                      vstChannels="0, 1" />
    <SourceDirectivity      id="dir:trumpet"
                      file="trumpet.sofa" />
    <objectSource     id="src:trumpet"
                      position="2 1.7 -1.25"
                      orientation="30 -12 0"
```

```
                signal="signal:trumpet"
                directivity="dir:trumpet"
                gainob="-2"
                active="true" />
</AudioScene>
```

It is to be understood that the above example merely serves as an example of audio scene description information. Other forms of audio scene description may contain many more nodes and audio elements. However, it can be seen that an audio scene information file declares the scene's entities and contains references to data that is in the other input files. These input files (or file pathnames) may be referenced in the declaration syntax of the entities. All pathnames are specified relative to the directory containing the scene.xml file. The audio description information file may also describe dynamic behaviour over time of any audio elements within the audio scene.

As previously discussed the 6DoF MPEG-I Audio Renderer 102 can be considered to comprise a pipeline of retrieving the audio rendering data 1021 followed by the auralization of the rendered audio data 1022. The retrieval of the audio rendering data can be in part governed by the changes in the audio scene as a result actions by the user. These changes may generally take the form of a list of instructions or directives which cater for various changeable scenarios in the audio scene initiated by the user. For example, if a user walks into a particular zone of the audio scene then a particular audio element or combinations of audio elements may need to be rendered with particular rendering parameters to provide for the change of the audio scene from the user perspective. In order to cater for this functionality, the pre-processing and audio data retrieval stage 1021 of the 6DoF Audio Renderer 102 may comprise a specific change in the audio scene, in other words an audio scene change (ASC) which can be triggered by a particular ASC condition being met. The triggering of the ASC condition may be in response to some action instigated by the user. Therefore, within a 6DoF Audio Renderer 102, there may be a list of ASC conditions which trigger corresponding changes to the audio scene (ASCs). In other words, for each ASC condition there is a corresponding ASC.

Following is an example of an ASC condition:

```
<!-- Listener proximity based trigger -->
<ListenerProximityCondition id="cond:user_near_poster"
    region="geo:user_position_trigger" />
<Cylinder id="geo:user_position_trigger"
    position="2 1 -0.5" orientation="0 0 0" size="1.5 4.0 1.5"/>
<!-- play additional instruments when user is near poster -->
<Update condition="cond:user_near_poster">
    <Modify id="src:vocals1" active="true"/>
    <Modify id="src:ukulele1" active="true"/>
    <Modify id="src:ukulele1" active="true"/>
    <Modify id="src:shaker" active=""true"/>
    <!-- Hysteresis -->
    <Modify id="geo:user_position_trigger" size="1.7 4.0 1.7"/>
</Update>
<!-- mute additional instruments when user not near poster -->
<Update condition="cond:user_near_poster" fireOn="false">
    <Modify id="src:vocals1" active="false"/>
    <Modify id="src:ukulele1" active="false"/>
    <Modify id="src:ukulele2" active="false"/>
    <Modify id="src:shaker" active="false"/>
    <!-- Hysteresis -->
    <Modify id="geo:user_position_trigger" size="1.5 4.0 1.5"/>
</Update>
```

In the above example, there is a scene change condition defined based on proximity, four audio objects are enabled if the user crosses into a certain region in the virtual scene. It can be seen, therefore, that there are multiple such ASC conditions which may need to be checked in order to determine if the ASC is to be triggered. The process can occur for every frame which can result in the renderer being overloaded.

The act of determining which ASC conditions have been met can have a direct influence on which particular audio elements and other audio scene related information such as acoustic elements (along with the Audio scene Information) are retrieved from the audio rendering data 101 in order to construct the audio scene for the user.

The first pipeline stage 1021 of the 6DoF Audio renderer can therefore be envisaged as having a pre-processing stage whereby each ASC condition is checked in respect to the user's position within the audio scene. This pre-processing stage may then determine which particular audio elements and other audio scene paraphernalia are retrieved from the stored/streamed audio rendering data 101.

Finally, FIG. 1 shows the final stage of the pipeline as the auralization stage 1022 whereby the audio elements and other audio scene related paraphernalia from the previous pipeline stage 1021 are processed into the audio scene. The auralization stage may comprise various mathematical models and signal processing functions to create the sound fields of the various audio elements which make up the audio scene. The various auralization techniques which can be used to process the rendered audio components of the audio scene are well documented in the scientific literature covering this field, and the reader is referred to such literature.

Returning to the above discussed problem, it can be seen that if the scope of influence or zone of impact of the user within the whole audio scene is limited then the subsequent processing of the audio scene around the user can be reduced to that scope or zone. In other words, there may be no need to process ASCs for the entire audio scene but instead only those ASCs which are within the impact zone of the user.

Therefore, this invention proceeds from the desire to define an impact zone in relation to the user's space within the audio scene. This can have the effect of reducing the number of ASCs triggered as a result of the user's movements which in turn reduces the amount of processing and rendering required to reflect the changes to the audio scene.

Audio elements in 6DoF systems are rendered based on the (listener) user's position and rotation within the virtual audio scene. Therefore, different audio elements become audible for the user depending on user movement in the content consumption space (or audio scene.)

Figure 2A:
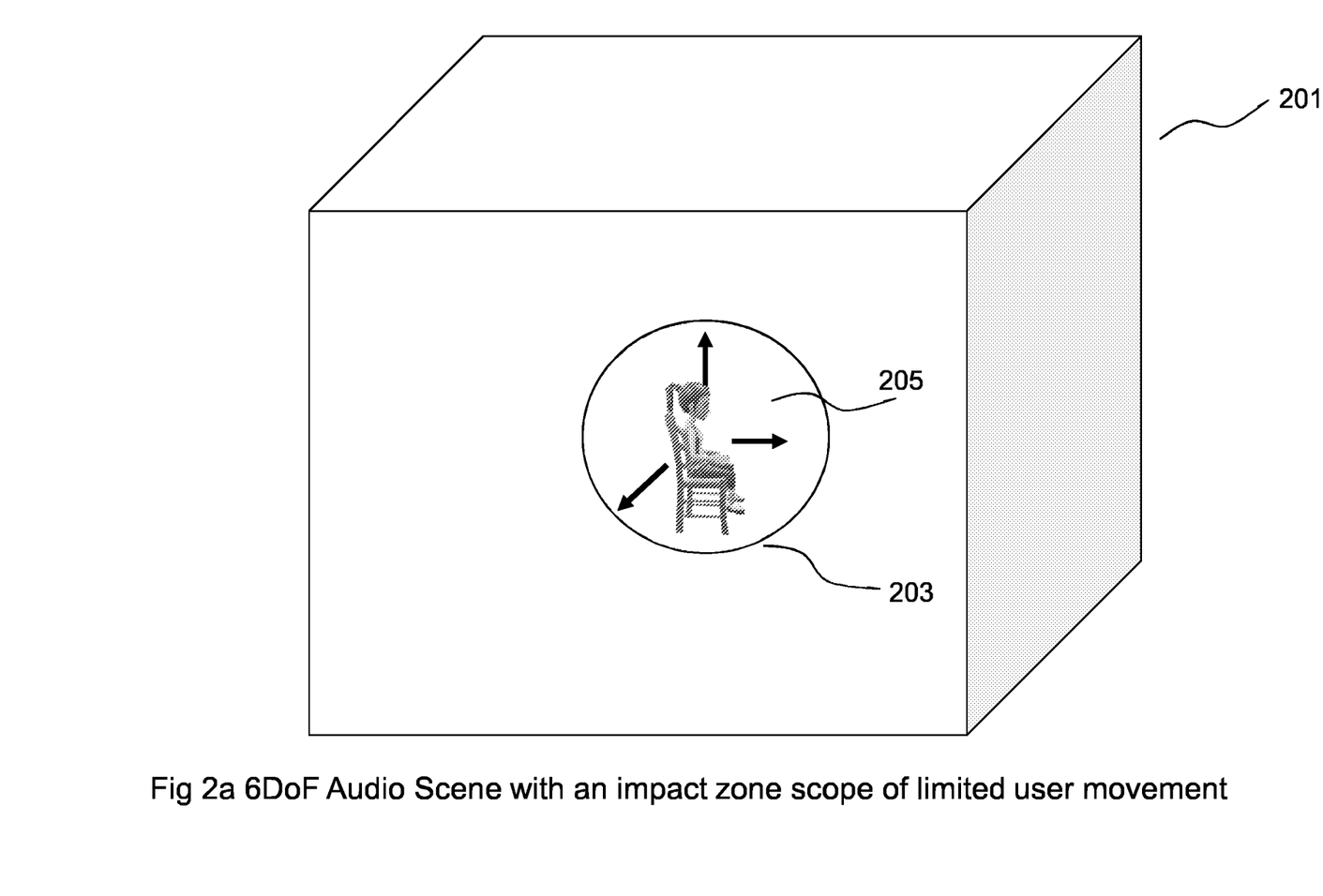
FIGS. 2a and 2b: shows an extent of the impact zone within a 6DoF audio scene according to embodiments.
Figure 2B:
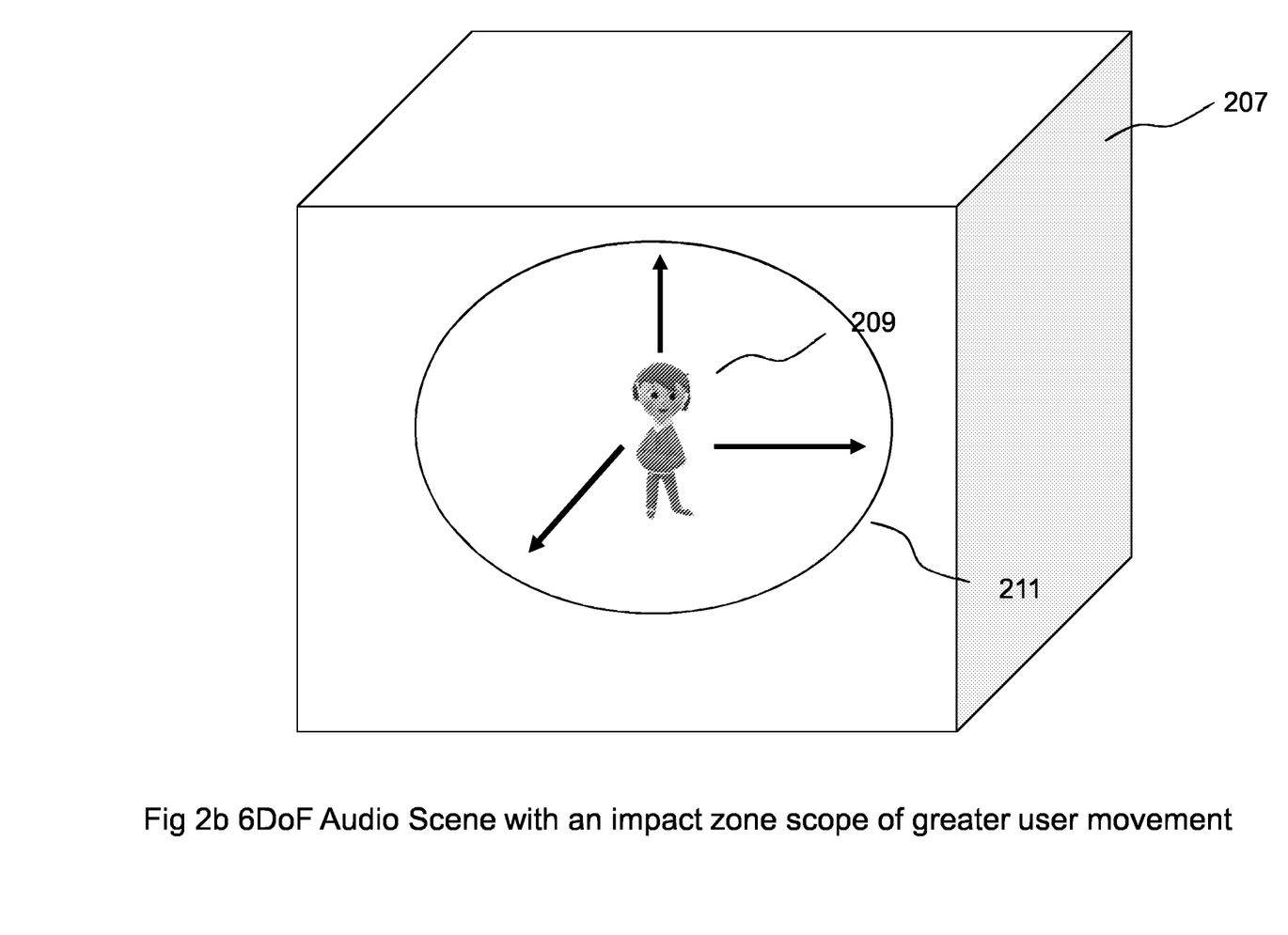

With this in mind we turn to FIGS. 2a and 2b in which there is depicted 6DoF audio scene 201 and 207 each with a user 203 and 209 represented in their respective virtual audio scene. It can be seen that over a short period of time the user's movement may be limited to a relatively small area of the audio scene (205 and 211) when compared to the total scope of the audio scene. This reduced scope of virtual audio space may be termed an impact audio zone because at any time only those elements within the reduced scope are impacted by the movement of the user. Therefore, only those audio elements associated with the reduced scope of the audio space may be required to be processed in order to update the audio scene as a result of the user's movements. In other words, by limiting the extent of the impact zone to be less than the entire audio scene, this has the effect of limiting the number of possible ASCs which can be triggered compared to the total number of ASCs associated with whole audio scene. This leads to the advantage that the triggering conditions of a fewer number of ASCs are required to be monitored in order to cover the changes of the audio scene as a result of the user's movements.

The size or dimensions of the "impact zone" may be determined in part by the range of allowable movements the user (listener) is able to perform whilst using the application. For instance, if the user 203 is in a sitting position the size of the "impact zone" may be determined by the possible range of movements of the head. However, with reference to FIG. 2b, the user 209 is allowed to move freely within the audio scene 207. Consequently, the impact zone 211 can be bigger in order to cater for the larger number of ASCs which can be triggered by the user's 203 movements within the audio scene 207.

In embodiments the impact zone may be modelled as a virtual space around the user and may take a set form such as cube or a sphere as shown by 205 and 207 in FIGS. 2a and 2b respectively. Alternatively, the impact zone space may take an arbitrary shape defined by a mesh consisting of a list of vertices (3D coordinates) and a number of triangular faces (i.e. the indices of three vertices). The size of the possible impact zone extent can be embedded as an impact zone description timed metadata track based on the content creator's preference. The encoder may then analyse the audio elements present in the audio scene to determine the bitrate impact of the impact zone size.

In some embodiments a discrete number of impact zones may be added based on a content creator preference in order to control which objects in the audio scene are accessible. This may lead to an advantageous result whereby a semantic coherence can be maintained. For instance, the case may arise when there is a need to have two audio objects in the audio scene, however restrictions to the impact zone result in only one audio object being accessible. In this case a smaller impact zone may be selected in order to maintain continuity of the audio scene.

In embodiments the extent of the impact zone (or the boundary of the impact zone) or also known as a limited area audio scene may be signalled to the renderer using the following data struct.

```
aligned(8) class ImpactZoneExtentStruct( ) {
    unsigned int(16) distance_scale;
    unsigned int(16) maxX;
    unsigned int(16) maxY;
    unsigned int(16) maxZ;
}
```

Where distance_scale is a positive scale value which indicate the units used for the following distance measurements in the structure. For instance, a particular value of distance_scale can signify that any distance measurements are in 1 cm units. However, the distance_scale could be defined to represent a unit of any suitable scale, such as a metre. The variables maxX, maxY and maxZ indicate the extent of the impact zone in terms of the distance scale units based around the user's head as the origin.

Figure 5:
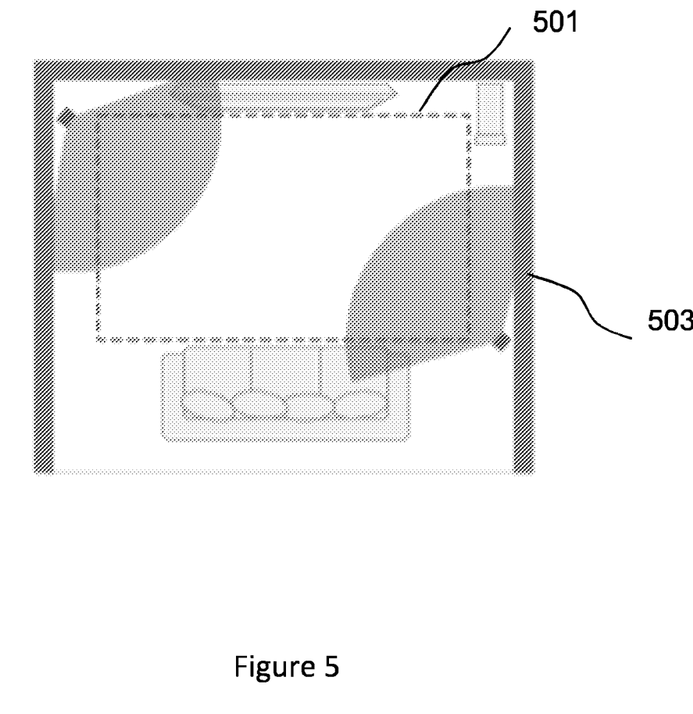
FIG. 5: shows an example of an extent in accordance with an area of a physical room.

In some embodiments the extent may define an area within a physical room for VR/AR audio playback, and that the audio scene change would facilitate the rendering of the necessary audio elements/audio objects or combinations thereof to provide the VR audio scene for the defined area. FIG. 5 depicts an area 501 (defined by the extent) within a physical room 503, in which the area may be given by the x and y physical dimensions.

In some embodiments the above data structure defining the extent of the impact zone may be signalled as part of a timed metadata track. For instance, the data structure defining the extent of the impact zone may be part of a sample entry within a timed metadata track encapsulated as a moov box according to the ISO Base Media File Format (ISOBMFF). In these embodiments the sample entry of the metadata track can be used to provide continuous updates in time of the extent of the impact zone to the audio renderer, which in turn enables the triggering of ASC in different parts of the audio scene for animated video. The metadata track having the impact zone sample entry may accompany and apply to any number of omnidirectional video tracks within the moov box.

In these embodiments the data structure sample of the metadata track may have the track sample entry type 'izod' and can be specified as

```
class IzdSampleEntry( ) extends MetadataSampleEntry('izod') {
    unsigned int(16) distance_scale;
    unsigned int(16) maxX;
    unsigned int(16) maxY;
    unsigned int(16) maxZ;
    unsigned int(16) XaxisSteps;
    unsigned int(16) YaxisSteps;
    unsigned int(16) ZaxisSteps;
}
```

The sample syntax of the sample entry type 'izod' may be specified as

```
class IzdSample( ) {
    for (i = 0; j < ZaxisSteps; i++) {
        for (j = 0; j < XaxisSteps; j++) {
            for (k =0; k < YaxisSteps; j++) {
                unsigned int(16) bitrate_impact;
                for(m=0; i<num_audio_impacted; m++) {
                    unsigned int(16) mae_audioSceneInfoID[m];
                    unsigned int(16) mae_groupID[m];
                    unsigned int(16) mae_audioElementID[m];
                }
            }
        }
    }
}
```

Where ZaxisSteps, XaxisSteps and YaxisSteps are variables that have values which indicate the number of steps which the user can virtually move within the audio scene. So as the AV/VR virtual system provides details on the user's movement within the audio scene the sample entry type 'izod' provides information on the which audio elements are impacted by a step change of the user's position within the audio scene. The identification of the number audio elements num_audio_impacted impacted by a user's movement may be indicated according to the following members of the above sample data structure:

mae_audioSceneInfoID is an array indicating for each step the audio scene to which the audio element impacted by a step change belongs;

mae_groupID is an array indicating for each step the element group ID to which the audio element impacted by a step change belongs; and mae_audioElementID is an array indicating for each step the particular element within the group impacted by the step change.

Consequently, each audio element can be categorised by audio scene, element group within the audio scene and the particular audio element within the element group.

It may be seen from the above structure that the ZaxisSteps, XaxisSteps and YaxisSteps variables define a granularity of audio elements impacted by the user's movements. Such that each registered movement by the user in a sample period of time will converted to a number of steps along the three directions of movement X, Y and Z. The above 'izod' sample data structure may then provide an indication of which audio elements are impacted or pulled into scope for each possible Zaxis, Yaxis and Zaxis step.

Additionally, each step change, also may be accompanied with an indication of the bit rate requirement (or burden) of the respective step change of the user's position, given as bitrate_impact. In other words, bitrate_impact is the bitrate impact in terms of data size or kbps that can be provisioned for supporting a certain impact zone size, the larger step size then the greater the bitrate impact.

Consequently, the above sample entry type 'izod' allows for the impact zone data to become part of a timed metadata track according to the ISOBMFF standard thereby providing support of animated audio video scenes. The immersive content may have multiple different timed metadata tracks corresponding to different impact zone sizes. This allows the player to select the appropriate impact zone depending on the player preference or available bandwidth impact of the different impact zone description tracks. For example, an impact zone description track with a large impact zone extent is expected to have larger bitrate impact compared to one with a smaller impact zone extent.

Figure 3:
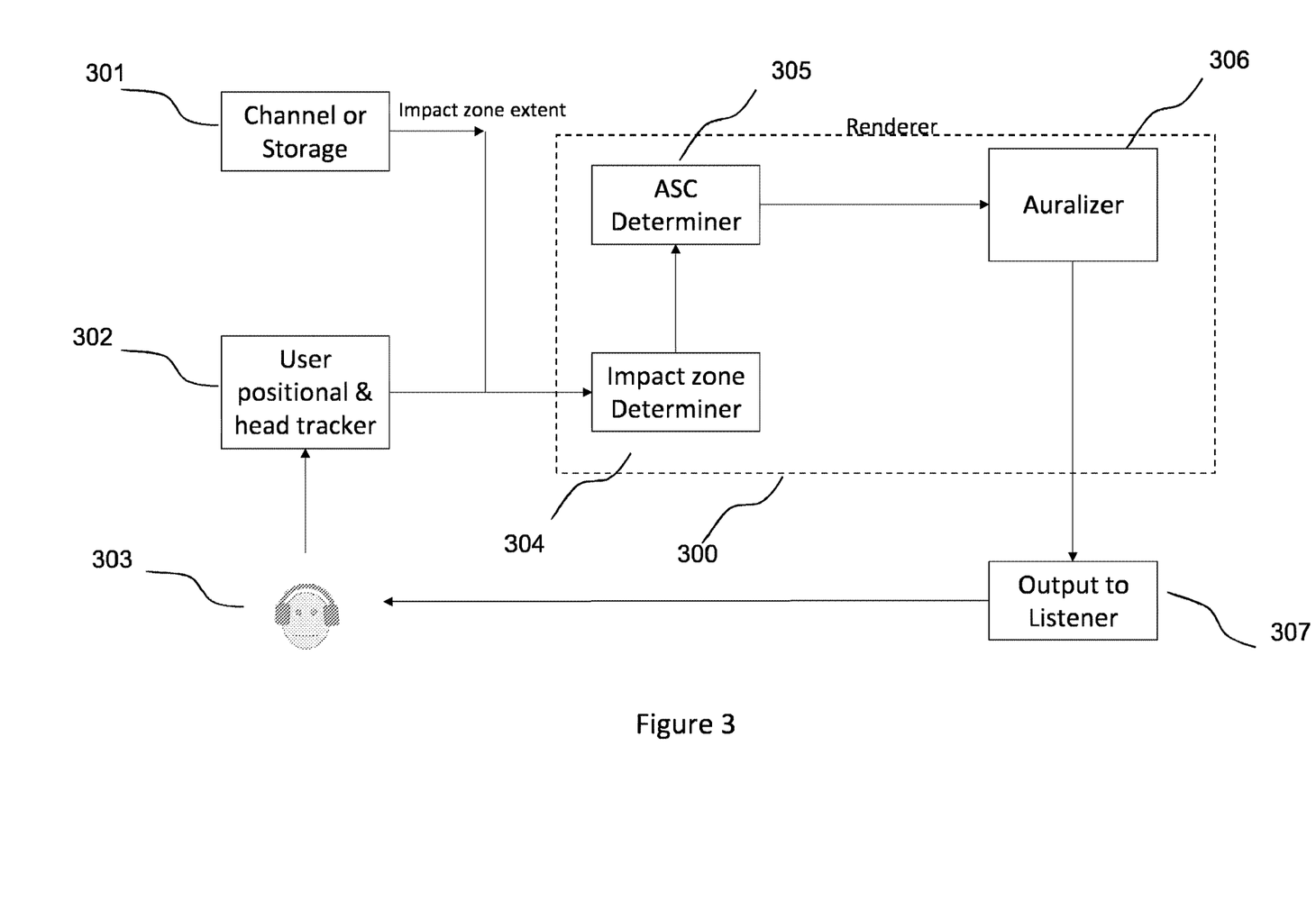
FIG. 3: shows schematically an example system suitable for implementing decoding rendering and outputting six degree of freedom audio according to some embodiments.

FIG. 3 shows an example rendering apparatus 300 such as a 6DoF MPEG-I audio renderer configured to implement above impact audio zone processing of ASCs. It would be understood that the apparatus may be implemented on any suitable hardware and software (firmware) combination. In some embodiments the apparatus is implemented by a digital workstation (DAW) with a VR user interface.

The rendering apparatus 300 may be arranged to receive from the channel or storage 301 the encoded audio elements and audio scene information in addition to the streamed or stored ASC impact data, in other words the Audio rendering data according to the parlance of the pipeline in FIG. 1. The Audio rendering data may be streamed or stored as a file format type (the file format type may conform to the ISOBMFF). In embodiments ASC impact data may comprise the impact zone extent information such as the ImpactZoneExtentStruct in the case of static audio scene or a timed metadata track having the above 'izod' sample entry type in the case of an animated scene.

In some embodiments there may be a specific communication channel signalling the impact zone extent information to the renderer 300.

Furthermore, in relation to the channel or storage 301 a timed metadata track may accompany a stored or streamed an impact zone timed metadata track.

The renderer 300 is also arranged to receive user position and head tracker information 302 from a user 303 equipped with suitable 6DoF determination apparatus.

Within the renderer 300 the received impact zone extent information may be used in conjunction with the user position and head tracker information by the impact zone determiner 304 in order to determine the positional information of the user in relation to the bounds of the impact zone extent. In embodiments deploying impact zone extent information in the form of 'izod' sample entry this process may involve determining the nearest step index along the three directions of movement X, Y and Z. The output from the impact zone determiner 304 may then be the position within the extent of the impact zone of the user. This information can be used to determine the specific ASCs which are triggered by this position.

Information regarding the user's position within the extent of the impact zone may then be passed to the ASC determiner 305. The ASC determiner 305 may be configured to use this information to determine which ASCs are triggered within the extent of the impact zone by the user's position. In embodiments the determination process may take the form of determining which of the list of ASC conditions (associated with the extent of the impact zone) have been met by the user's position in the impact zone. As explained previously each ASC condition may be associated with a corresponding ASC, and the ASC may have associated with it rendering parameters of one or more audio elements within the audio scene in order to process the change to the audio scene from the user's perspective. It is to be understood that a particular ASC may also comprise changes to rendering parameters of other acoustic properties of the audio scene.

In embodiments (which employ the impact zone approach to determining ASCs) a cache processing structure may be used in which all rendering parameters associated with the elements of each ASC are pre-calculated and held in a cache memory store. The cache processing approach may be particular useful in this circumstance because there are only a limited number of ASCs which can be triggered within the extent of the impact zone. Thereby making it feasible to pre-calculate the respective rendering parameters and hold them in a cache memory along with their ASC identification in order to improve processing efficiency.

In one operating scenario of the renderer 300, the renderer 300 may receive impact zone extent information via an application interface. The renderer 300 may then check the ASC conditions within the impact zone as determined by the user's position and orientation. The ASC conditions may be prestored in the cache. If any particular ASC condition is triggered by data resulting from the user's position and orientation the corresponding ASC and accompanying audio elements including respective rendering parameters may be retrieved for the auralization of the audio scene.

In another operating scenario of the renderer 300, as before the renderer 300 may receive impact zone extent information via an application interface. Additionally, the renderer 300 may receive a number of timed metadata tracks each carrying different audio elements relating to different impact zone extent regions (an impact zone description timed metadata track). The renderer may then select the appropriate the impact zone description timed metadata track for the particular impact zone. The renderer 300 may then determine which ASC conditions are triggered from the from the selected impact zone description timed metadata track. The impact zone description timed metadata track may have incorporated within the bitrate_impact data structure, thereby allowing the renderer to determine the processing requirements for the selected time metadata track.

The output from the ASC determiner 305 may therefore comprise the audio rendering parameters associated with each triggered ASC within the impact zone extent. These parameters may be passed together with the Audio element and acoustic environment metadata from the channel and storage 301 to the auralizer 306. The Auralizer 306 may then process the audio elements and acoustic properties associated with the triggered ASCs in order produce the virtual audio scene. As mentioned earlier the Auralizer 306 may deploy a number of techniques to achieve this such as decoding and signal processing technologies to process the audio elements and various mathematical models to process acoustical room characteristics in order to create the sound fields making up the audio scene. The output 307 from the auralizer 306, the rendered audio signals, may be presented to the user 303, for example by headphone.

Figure 4:
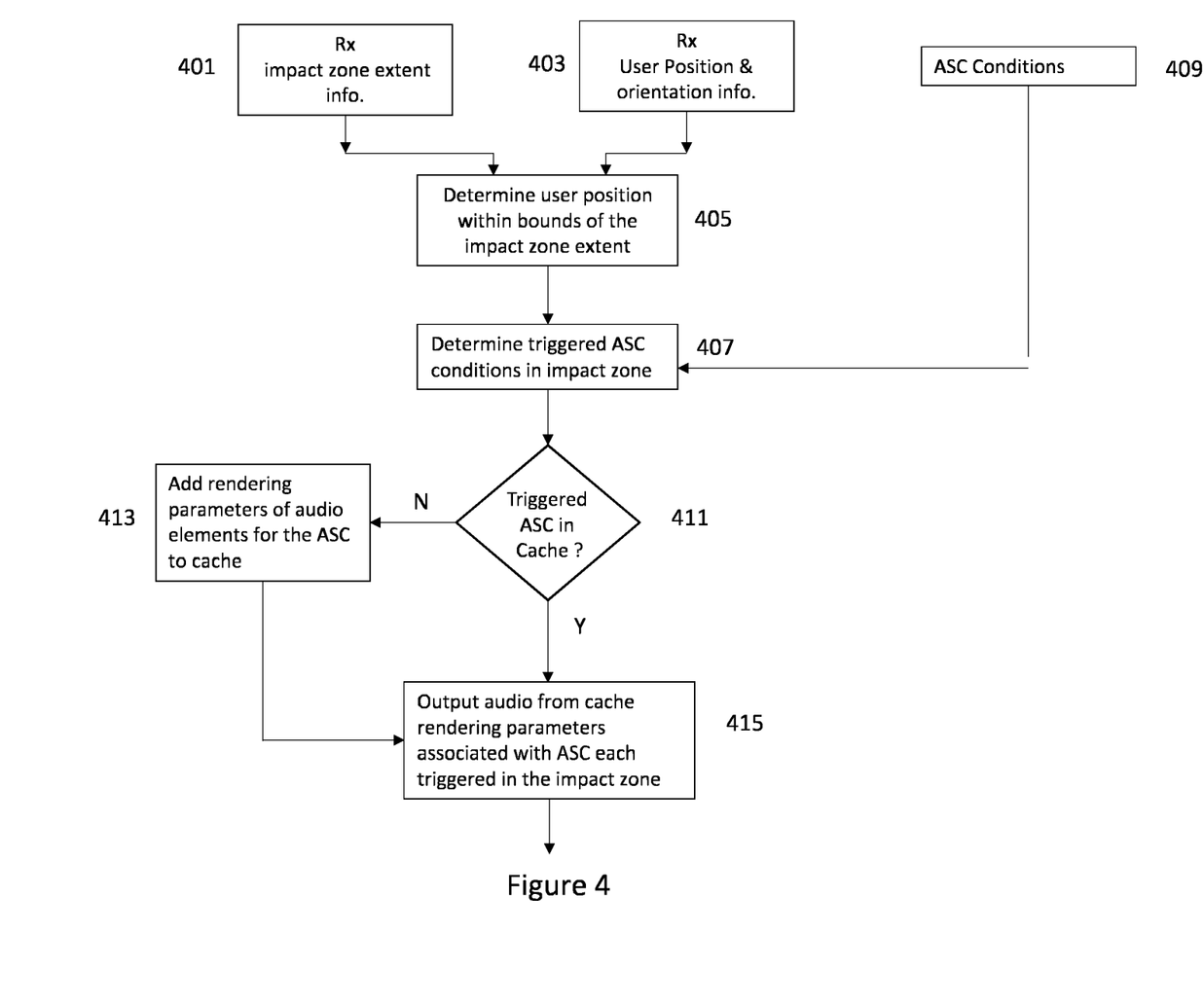
FIG. 4: is a process flow diagram illustration a process according to embodiments of these teachings.

FIG. 4 shows a set of processing steps which may be processed by the 6DoF Audio renderer for the purposes of rendering ASC within the impact zone. With reference to FIG. 3 the following processing steps may be performed within the confines of the impact zone determiner 304 and the ASC determiner 305.

The processing steps of the 6DoF audio renderer may be configured to receive the impact zone extent information along with the user position & orientation information these are shown as processing steps 401 and 403 in FIG. 4. As mentioned above these may be used to determine the position of the user with respect to the impact zone. In this respect processing step 405 is depicted as using the above two pieces of information in order to determine the position of the user in the impact zone. The result of this processing step is used to determine which ASCs conditions are triggered within the impact zone. This is shown as the processing step 407 where it can be seen that the ASC conditions associated with the impact zone are received as processing step 409. The output of 407 is then passed to the decision processing step 411 which determines if the ASC id is present in the cache memory. The cache can comprise at least one of the following: ASC condition ID; ASC condition; and ASC condition and associated rendering parameters.

If the ASC has not been added to the cache then the processed audio rendering parameters of the audio elements associated with the triggered ASC are added to the cache along with the ASC id. This is shown as the processing step 413 in FIG. 4. Finally, the processed audio rendering parameters of the audio elements associated with the triggered ASC are shown as being an output from the cache as processing step 415 in FIG. 4.

Figure 6:
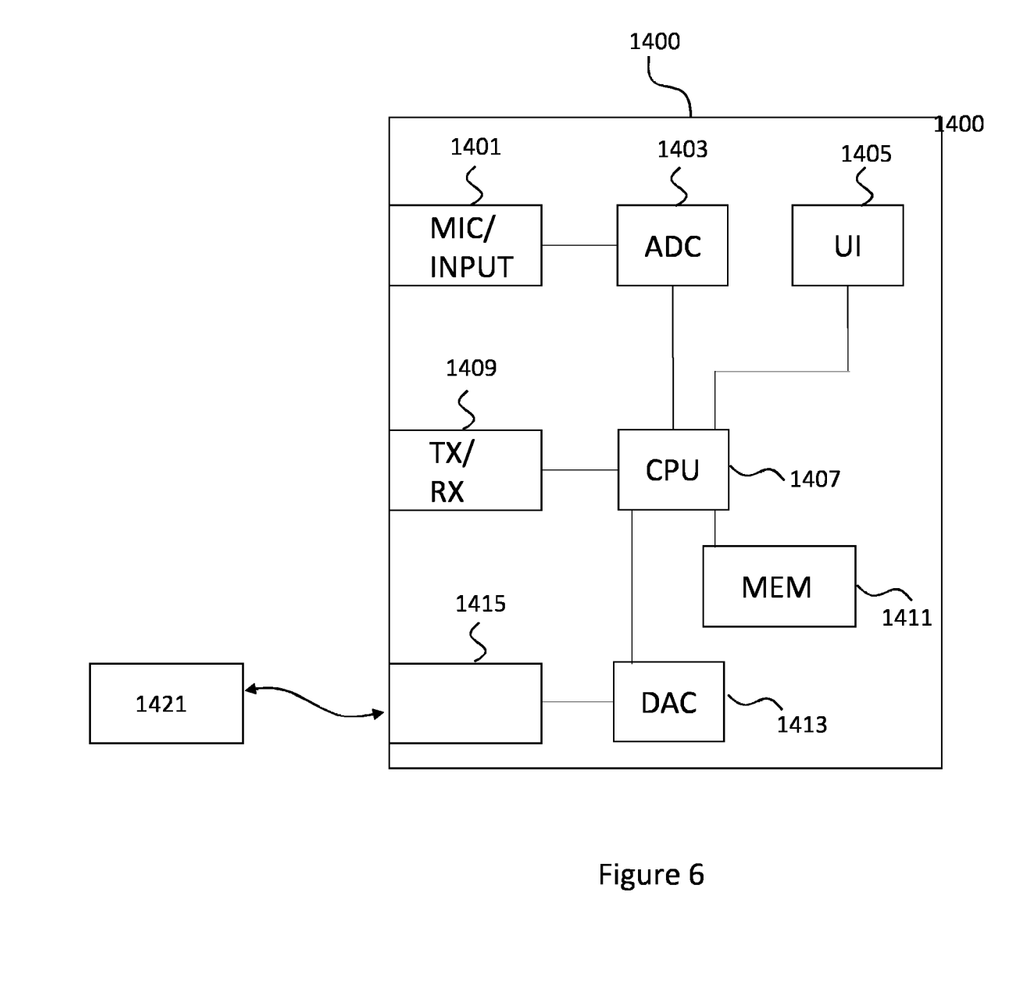
FIG. 6: shows schematically an example device suitable for implementing the apparatus shown above according to some embodiments.

With respect to FIG. 6 an example electronic device which may be used as the capture device and/or audio signal analyser/processor and/or playback device is shown. The device may be any suitable electronics device or apparatus. For example, in some embodiments the device 1400 is a mobile device, user equipment, tablet computer, computer, audio playback apparatus, etc.

The device 1400 may comprise a microphone or microphone array 1401. The microphone or microphone array 1401 may comprise a plurality (for example a number N) of microphone elements. However, it is understood that there may be any suitable configuration of microphones and any suitable number of microphones.

In some embodiments the microphone or microphone array 1401 is separate from the apparatus and the audio signal transmitted to the apparatus by a wired or wireless coupling. The microphone or microphone array 1401 may in some embodiments be the microphone array as shown in the previous figures.

The microphone or microphone array may comprise transducers configured to convert acoustic waves into suitable electrical audio signals. In some embodiments the microphone or microphone array may comprise solid state microphones. In other words the microphones may be capable of capturing audio signals and outputting a suitable digital format signal. In some other embodiments the microphone or microphone array 1401 can comprise any suitable microphone type or audio capture means, for example condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone or microphone array can in some embodiments output the audio captured signals to an analogue-to-digital converter (ADC) 1403.

The device 1400 may further comprise an analogue-to-digital converter 1403. The analogue-to-digital converter 1403 may be configured to receive the audio signals from each microphone 1401 and convert them into a format suitable for processing. In some embodiments where the microphone or microphone array comprises integrated microphone the analogue-to-digital converter is not required. The analogue-to-digital converter 1403 can be any suitable analogue-to-digital conversion or processing means. The analogue-to-digital converter 1403 may be configured to output the digital representations of the audio signals to a processor 1207 or to a memory 1411.

In some embodiments the device 1400 comprises at least one processor or central processing unit 1207. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some implements the device 1400 comprises a transceiver 1409. The transceiver 1409 in such embodiments can be coupled to the processor 1407 and configured to enable a communication with other apparatus or electronic devices, for example via a wireless communications network. The transceiver 1409 or any suitable transceiver or transmitter and/or receiver means can in some embodiments be configured to communicate with other electronic devices or apparatus via a wire or wired coupling.

For example, the transceiver 1409 may be configured to communicate with the renderer as described herein.

The transceiver 1409 can communicate with further apparatus by any suitable known communications protocol. For example in some embodiments the transceiver 1409 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the device 1400 may be employed as at least part of the audio processor. As such the transceiver 1409 may be configured to receive the audio signals and positional information from the capture device microphones or microphone array and in some embodiments determine the parameters as described herein by using the processor 1407 executing suitable code. Furthermore the device may generate a suitable audio signal and parameter output to be transmitted to the renderer or spatial processing device.

In some embodiments the device 1400 may be employed as at least part of the renderer. As such the transceiver 1409 may be configured to receive the audio signals from the microphones or microphone array and in some embodiments the parameters determined at the capture device or processing device as described herein, and generate a suitable audio signal rendering by using the processor 1407 executing suitable code. The device 1400 may comprise a digital-to-analogue converter 1413. The digital-to-analogue converter 1413 may be coupled to the processor 1407 and/or memory 1411 and be configured to convert digital representations of audio signals (such as from the processor 1407 following an audio rendering of the audio signals as described herein) to a suitable analogue format suitable for presentation via an audio subsystem output. The digital-to-analogue converter (DAC) 1413 or signal processing means can in some embodiments be any suitable DAC technology.

Furthermore, the device 1400 can comprise in some embodiments an audio subsystem output 1415. An example as shown in FIG. 11 shows the audio subsystem output 1415 as an output socket configured to enabling a coupling with headphones 1421. However, the audio subsystem output 1415 may be any suitable audio output or a connection to an audio output. For example, the audio subsystem output 1415 may be a connection to a multichannel speaker system.

In some embodiments the digital to analogue converter 1413 and audio subsystem 1415 may be implemented within a physically separate output device. For example, the DAC 1413 and audio subsystem 1415 may be implemented as cordless earphones communicating with the device 1400 via the transceiver 1409.

Although the device 1400 is shown having both audio capture, audio processing and audio rendering components, it would be understood that in some embodiments the device 1400 can comprise just some of the elements.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   receiving information defining a limited area audio scene within a virtual reality audio scene, wherein the limited area audio scene defines a sub space of the virtual reality audio scene, and wherein the information defines the limited area audio scene by defining a movement capability of a user within the virtual audio scene;
   processing only one or more audio scene changes that are within the limited area audio scene without processing one or more other audio scene changes that are within the virtual reality audio scene but outside of the limited area audio scene, wherein processing the one or more audio scene changes for the limited area audio scene comprises determining whether a movement of the user within the limited area audio scene meets a condition of the one or more audio scene changes in order to trigger the one or more audio scene changes; and
   processing a change to an audio scene based upon rendering parameters of one or more audio elements within the virtual reality audio scene that are associated with the one or more audio scene changes that are determined to be triggered.

2. The method as claimed in claim 1, wherein the movement capability is defined as a number of predetermined directional steps, wherein each of the predetermined directional steps has at least one associated audio scene change condition, and wherein the at least one audio scene change condition is associated with a respective at least one audio scene change, and wherein determining whether the movement of the user within the limited area audio scene meets the condition of the one or more audio scene changes comprises determining that the movement of the user meets the at least one audio scene change condition of one of the number of predetermined directional steps, and wherein processing the change to the audio scene comprises processing a respective at least one audio scene change associated with the at least one audio scene change condition.

3. The method as claimed in claim 2, wherein each defined directional step or movement is accompanied by an indication as to a processing power required to process the respective at least one audio scene change.

4. The method as claimed in claim 1, wherein the movement capability is defined as an area of the virtual reality audio scene within a physical space, wherein the area has at least one associated audio scene change condition and wherein the at least one audio scene change condition is associated with a respective at least one audio scene change, wherein determining whether the movement of the user within the limited area audio scene meets the condition of the one or more audio scene changes comprises determining that the movement of the user meets the at least one audio scene change condition of the area, and wherein processing the change of the audio comprises processing a respective at least one audio scene change associated with the at least one audio scene change condition.

5. The method as claimed in claim 1, wherein the information defining the limited area audio scene is a data structure of a timed metadata track.

6. The method as claimed in claim 5, wherein the data structure comprises, for the at least one audio scene change, at least one of the following data fields:
an identifier indicating an audio scene associated with the condition of the at least one audio scene change;
an identifier identifying a group of audio elements comprising an audio element associated with the condition of the at least one audio scene change condition; or
an identifier identifying an audio element associated with the condition of the least one audio scene change.

7. The method as claimed in claim 5, wherein the information defining a limited area audio scene comprises part of a sample entry within a timed metadata track according to the ISO Base Media File Format (ISOBMFF).

8. The method as claimed in claim 1, wherein the one or more audio scene changes are each defined by at least one audio element and the rendering parameters of the at least one audio element.

9. The method as claimed in claim 8, wherein the at least one audio element comprises at least one of:
an audio object;
an audio channel; or
higher order ambisonics.

10. The method as claimed in claim 1 wherein the rendering parameters associated with the audio scene changes within the limited area audio scene are precalculated and stored.

11. An apparatus comprising at least one processor and at least one memory including computer program code, the at least one memory and the computer program code configured to, with the at least one processor, cause the apparatus to:
receive information defining a limited area audio scene within the virtual reality audio scene, wherein the limited area audio scene defines a sub space of the virtual reality audio scene, wherein the information defines the limited area audio scene by defining a movement capability of a user within the virtual audio scene;
process only one or more audio scene changes that are within the limited area audio scene without processing one or more other audio scene changes that are within the virtual reality audio scene but outside of the limited area audio scene, wherein the one or more audio scene changes for the limited area audio scene are processed by determining whether a movement of the user within the limited area audio scene meets a condition of the one or more audio scene changes in order to trigger the one or more audio scene changes; and
process a change to an audio scene based upon rendering parameters of one or more audio elements within the virtual reality audio scene that are associated with the one or more audio scene changes that are determined to be triggered.

12. The apparatus as claimed in claim 11, wherein the movement capability is defined as a number of predetermined directional steps, wherein each of the predetermined directional steps has at least one associated audio scene change condition and wherein the at least one audio scene change condition is associated with a respective at least one audio scene change, wherein the apparatus caused to determine whether the movement of the user within the limited area audio scene meets a condition of the one or more audio scene changes is caused to determine that the movement of the user meets the at least one audio scene change condition of one of the number of predetermined directional steps, and wherein the apparatus caused to process the change to the audio scene change is caused to process a respective at least one audio scene change associated with the at least one audio scene change condition.

13. The apparatus as claimed in claim 12, wherein each defined directional step or movement is accompanied by an indication as to the processing power required to process the respective at least one audio scene change.

14. The apparatus as claimed in claim 11, wherein the movement capability is defined as an area of the virtual reality audio scene within a physical space, wherein the area has at least one associated audio scene change condition and wherein the at least one audio scene change condition is associated with a respective at least one audio scene change, wherein the apparatus is further caused to determine whether the movement of the user within the limited area audio scene meets a condition of the one or more audio scene changes is caused to determine that the movement of the user meets the at least one audio scene change condition of the area, and wherein the apparatus is further caused to process the change of the audio is caused to process a respective at least one audio scene change associated with the at least one audio scene change condition.

15. The apparatus as claimed in claim 11, wherein the information defining the limited area audio scene is a data structure of a timed metadata track.

16. The apparatus as claimed in claim 15, wherein the data structure comprises for the at least one audio scene change at least one of the following data fields:

an identifier indicating an audio scene associated with the condition of the at least one audio scene change;

an identifier identifying a group of audio elements comprising an audio element associated with the condition of the at least one audio scene change condition; and an identifier identifying an audio element associated with the condition of the least one audio scene change.

17. The apparatus as claimed in claim 15, wherein the information defining a limited area audio scene is part of a sample entry within a timed metadata track according to the ISO Base Media File Format (ISOBMFF).

18. The apparatus as claimed in claim 11, wherein the one or more audio scene changes are each defined by at least one audio element and the rendering parameters of the at least one audio element.

19. The apparatus as claimed in claim 18, wherein the at least one audio element comprises at least one of:
an audio object;
an audio channel; and
higher order ambisonics.

20. The apparatus as claimed in claim 11 wherein the rendering parameters associated with the audio scene changes within the limited area audio scene are precalculated and stored.

21. A computer program product embodied on a non-transitory computer readable medium, comprising computer program code configured to, when executed on at least one processor, cause an apparatus to:

receive information defining a limited area audio scene within the virtual reality audio scene, wherein the limited area audio scene defines a sub space of the virtual reality audio scene, wherein the information defines the limited area audio scene by defining a movement capability of user a within the virtual audio scene;

process only one or more audio scene changes that are within the limited area audio scene without processing one or more other audio scene changes that are within the virtual reality audio scene but outside of the limited area audio scene, wherein the one or more audio scene changes for the limited area audio scene are processed by determining whether a movement of the user within the limited area audio scene meets a condition of the one or more audio scene changes in order to trigger the one or more audio scene changes; and process a change to an audio scene based upon rendering parameters of one or more audio elements within the virtual reality audio scene that are associated with the one or more audio scene changes that are determined to be triggered.

22. The computer program product as claimed in claim 21, wherein the movement capability is defined as a number of predetermined directional steps, wherein each of the predetermined directional steps has at least one associated audio scene change condition, and wherein the at least one audio scene change condition is associated with a respective at least one audio scene change, and wherein determining whether the movement of the user within the limited area audio scene meets the condition of the one or more audio scene changes comprises determining that the movement of the user meets the at least one audio scene change condition of one of the number of predetermined directional steps, and wherein processing the change to the audio scene comprises processing a respective at least one audio scene change associated with the at least one audio scene change condition.

23. The computer program product as claimed in claim 21, wherein the movement capability is defined as an area of the virtual reality audio scene within a physical space, wherein the area has at least one associated audio scene change condition and wherein the at least one audio scene change condition is associated with a respective at least one audio scene change, wherein determining whether the movement of the user within the limited area audio scene meets the condition of the one or more audio scene changes comprises determining that the movement of the user meets the at least one audio scene change condition of the area, and wherein processing the change of the audio comprises processing a respective at least one audio scene change associated with the at least one audio scene change condition.

24. The computer program product as claimed in claim 21 wherein the rendering parameters associated with the audio scene changes within the limited area audio scene are precalculated and stored.

* * * * *